United States Patent
Beard et al.

(10) Patent No.: US 11,822,406 B2
(45) Date of Patent: Nov. 21, 2023

(54) POWERING PATCH PANEL SYSTEM

(71) Applicant: Dell Products L.P., Round Rock, TX (US)

(72) Inventors: Neal Beard, Austin, TX (US); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 17/361,512

(22) Filed: Jun. 29, 2021

(65) Prior Publication Data
US 2022/0413577 A1    Dec. 29, 2022

(51) Int. Cl.
*G06F 1/26* (2006.01)
*H04Q 1/02* (2006.01)
*H04B 10/27* (2013.01)
*H04B 10/80* (2013.01)
*H04L 12/10* (2006.01)

(52) U.S. Cl.
CPC ............ *G06F 1/266* (2013.01); *H04B 10/27* (2013.01); *H04B 10/807* (2013.01); *H04L 12/10* (2013.01); *H04Q 1/03* (2013.01)

(58) Field of Classification Search
CPC ....... G06F 1/266; H04B 10/27; H04B 10/807; H04L 12/10; H04Q 1/03
See application file for complete search history.

(56) References Cited

U.S. PATENT DOCUMENTS

| | | | |
|---|---|---|---|
| 2005/0136989 A1* | 6/2005 | Dove | G06F 1/28 455/572 |
| 2006/0063509 A1* | 3/2006 | Pincu | H04L 12/10 455/67.11 |
| 2008/0168283 A1* | 7/2008 | Penning | G06F 1/263 713/310 |
| 2013/0339760 A1* | 12/2013 | Zimmerman | H04L 12/10 713/300 |
| 2015/0078740 A1* | 3/2015 | Sipes, Jr. | H04L 12/10 398/16 |
| 2016/0020911 A1* | 1/2016 | Sipes, Jr. | H04B 10/40 398/16 |
| 2017/0117971 A1* | 4/2017 | Sipes, Jr. | H04B 10/808 |

* cited by examiner

*Primary Examiner* — Jaweed A Abbaszadeh
*Assistant Examiner* — Brian J Corcoran
(74) *Attorney, Agent, or Firm* — Joseph Mencher

(57) ABSTRACT

A powering patch panel system includes a patch panel device coupled to a power source, and including a first port that is coupled to a networking device via a first cable and a second port that is coupled to the powered device via a second cable. The patch panel device receives data that is directed to the powered device from the networking device through the first port and via the first cable, and receives power from the power source. The patch panel device then transmits both the data and a subset of the power through the second port and via the second cable to the powered device. The first port may be provided by optical-fiber-based port and the first cable may be provided by an optical-fiber-based cable, while the second port may be provided by a hybrid conductive-material/optical-fiber-based port and the second cable may be provided by a hybrid conductive-material/optical-fiber-based cable.

20 Claims, 14 Drawing Sheets

POWERING PATCH PANEL SYSTEM

BACKGROUND

The present disclosure relates generally to information handling systems, and more particularly to a patch panel system capable of powering a powered device via power/data transmission cabling.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are often provided in a datacenter to route data between devices connected to those switch devices (e.g., via cabling), and thus may be connected together (e.g., via cabling) as well as to those devices in order enable communications between those devices in the datacenter. Furthermore, some switch devices may be configured (e.g., via Power over Ethernet (PoE) protocols and/or other powering protocols known in the art) to provide power to connected devices (called "powered devices") via power/data transmission cabling (e.g., Ethernet cabling) that connects them to those connected/powered devices. However, such conventional "powering" switch devices often include up to 48 ports, and lack the power capacity required to power all of those ports at their maximum powering level. For example, the Institute of Electrical and Electronics Engineers (IEEE) 802.3bt standard (also referred to as PoE++ or 4PPoE) defines a "class 4 universal PoE (uPoE) powering level" of up to 100 watts delivered by a powering device, but the form factor of most conventional switch devices limit those switch devices to including a maximum of two 220-volt Power Supply Units (PSUs), which prevents those switch devices from powering more than approximately 12 of their ports at the maximum powering level.

As such, in datacenters with a relatively large number of powered devices (e.g., powered camera devices, powered badge/card readers, powered Voice over Internet Protocol (VoIP) phone devices, powered lighting devices, and/or other powered devices known in the art), decisions have to be made about which devices will be powered (or fully powered) by any particular switch device. Using the example above, conventional switch devices with two 220-volt PSUs may provide power to 12 devices via 12 of its ports at a maximum powering level, while providing power to some subset of devices via a corresponding subset of its ports that it is only capable of providing an intermediate powering level, and providing power to some subset of device via a corresponding subset of its ports that it is only capable of providing a low powering level. Thus, in datacenters where many powered devices require the maximum powering level, additional switch devices are required, raising the costs of providing and managing the datacenter, while increasing datacenter deployment and troubleshooting times as well.

Accordingly, it would be desirable to provide a powering system that addresses the issues discussed above.

SUMMARY

According to one embodiment, a patch panel Information Handling System (IHS) includes a chassis; at least one patch panel processing device that is housed in the chassis; and at least one patch panel memory device that is housed in the chassis, that is coupled to the at least one patch panel processing device, and that includes instructions that, when executed by the at least one patch panel processing device, cause the at least one patch panel processing device to provide a patch panel powering engine that is configured to: receive, from a networking device through a first port coupled to the at least one patch panel processing device and via a first cable connected to the first port, data that is directed to a powered device; receive, from a power source, power; and transmit, to the powered device, both the data and a subset of the power through a second port coupled to the at least one patch panel processing device and via a second cable connected to the second port and the powered device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
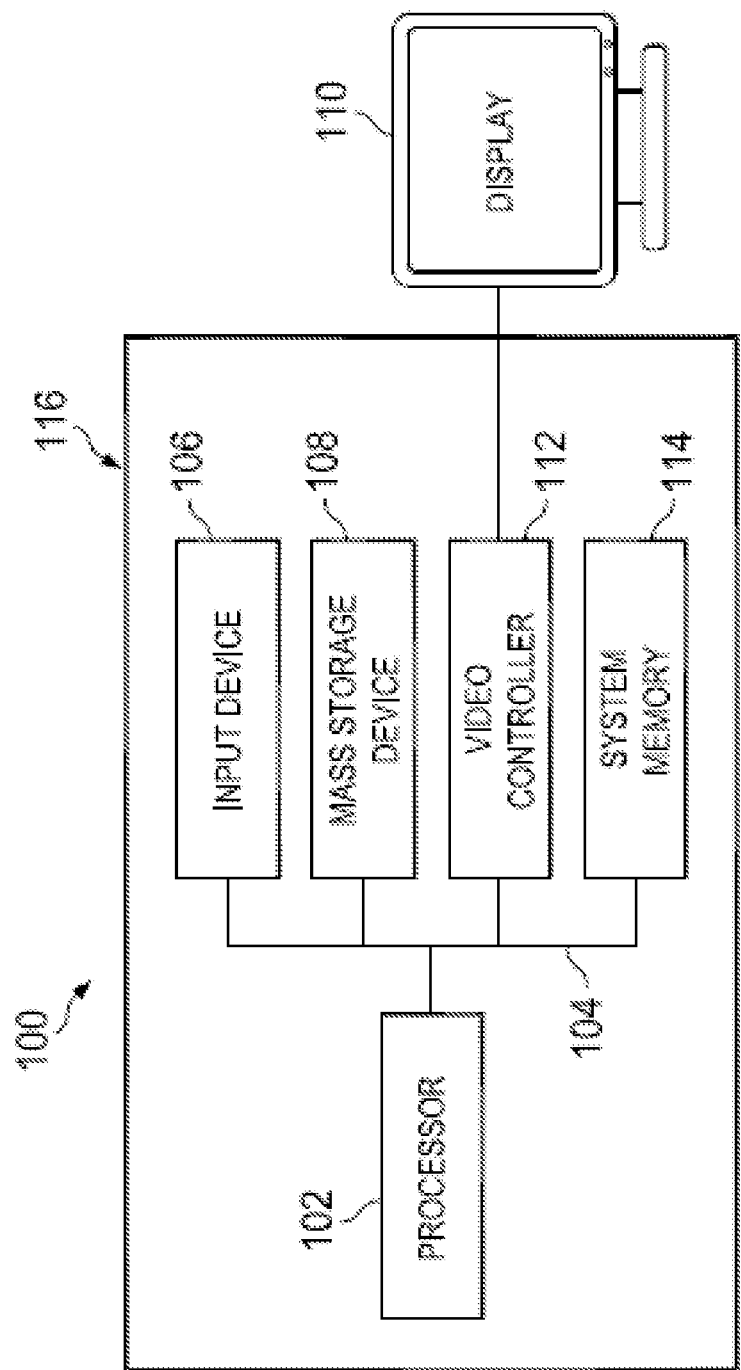
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
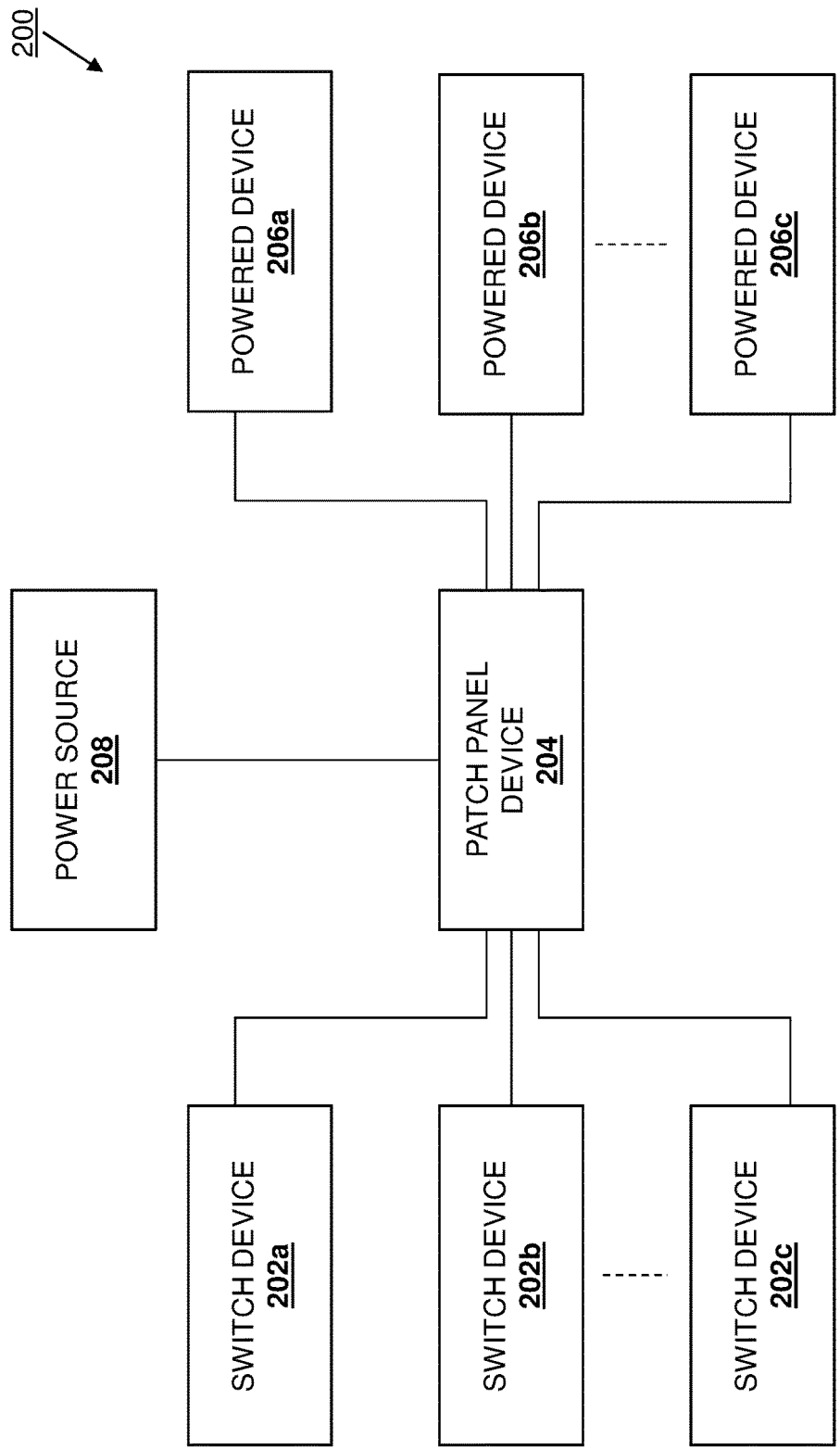
FIG. 2 is a schematic view illustrating an embodiment of a networked system that includes the powering patch panel system of the present disclosure.

Referring now to FIG. 2, an embodiment of a networked system 200 is illustrated. In the illustrated embodiment, the networked system 200 includes a plurality of switch devices 202*a*, 202*b*, and up to 202*c*. In an embodiment, the switch devices 202*a*-202*c* may be provided by the IHS 100 discussed above with reference to FIG. 1, and/or may include some or all of the components of the IHS 100, and in some of the specific examples below are provided by co-packaged switch devices, copper-port switch devices, hybrid power/fiber port switch devices, and/or other switch devices having powering capabilities (e.g., Power over Ethernet (PoE)) capabilities), while in others of the specific examples below are provided by fiber port switch devices, copper-port switch devices, co-packaged switch devices, and/or other switch devices without powering capabilities. However, while illustrated and discussed as being provided by particular switch devices with or without particular capabilities, one of skill in the art in possession of the present disclosure will recognize that switch devices provided in the networked system 200 may include other networking devices and/or other computing devices that may be configured to operate similarly as the switch devices 202*a*-202*c* discussed below.

The networked system 200 may also include a patch panel device 204 that is coupled to each of the plurality of switch devices 202*a*-202*c* via respective ports on the patch panel device 204, discussed in further detail below. In an embodiment, the patch panel device 204 may be provided by the IHS 100 discussed above with reference to FIG. 1, and/or may include some or all of the components of the IHS 100. As will be appreciated by one of skill in the art in possession of the present disclosure, the patch panel device 204 may include a variety of conventional patch panel features including an array of ports (e.g., switch device ports/networking device ports in the examples below) that may each be utilized to connect respective switch devices 202*a*-202*c* to each other and/or to the powered devices discussed below.

As will be appreciated by one of skill in the art in possession of the present disclosure, datacenters may include conventional patch panel devices (e.g., similar to the patch panel device 204 described herein but without the powering patch panel functionality discussed below) to which switch devices are connected (e.g., via cabling) in order to shorten the length of cabling needed to connect those switch devices, simplify switch device connection troubleshooting, and/or provide other patch panel benefits known in the art. For example, there are limits to the length of cabling along which data may be transmitted reliably (typically approximately 300 meters for conventional Ethernet cabling), and switch devices located at opposite ends of a relatively long datacenter may each be connected by a respective cable (e.g., having a length less than 300 meters) to a conventional patch panel device in order to connect those switch devices together. However, while a few particular patch panel purposes for patch panel devices have been described, one of skill in the art in possession of the present disclosure will appreciate how the patch panel device 204 may be provided in the networked system for a variety of other patch panel purposes while remaining within the scope of the present disclosure as well.

As such, the patch panel device 204 may differ from any of the switch devices 202*a*-202*c* based on that patch panel device 204 providing basic physical layer connectivity between two or more patch panel ports on the patch panel device 204 (e.g., to connect two or more devices), while not performing many (or all) of the layer 2 (L2) and layer 3 (L3) protocol operations that are conventionally performed by the switch devices 202*a*-202*c*. Furthermore, as discussed in further detail below, the patch panel device 204 is not limited in power capabilities like the switch devices 202*a*-202*c* (i.e., due to their form-factor constraints that limit the switch device chassis to, for example, 1 U or 2 U rack heights), and thus may support larger power systems and may allow for power system expansions (e.g., the chassis of each switch device 202a-202c may be limited to two power supply units, while the chassis of the patch panel device 204 may be configured to house eight or more power supply units). Further still, conventional switch devices are currently limited to between 1 Gigabit Ethernet (GbE) and 10 GbE data transmission speeds, while the patch panel device 204 may be configured to support data transmission speeds higher than 10 GbE. Yet further still, any one of the switch devices 202a-202c may be limited to 48 switch ports (particular when those switch devices 202a-202c are configured to power connected device via a PoE protocol), while the patch panel device 204 may be configured with 128 patch panel ports, 256 patch panel ports, 512 patch panel ports, or more in future implementations, as patch panel device designs may be modular and allow the addition of patch panel ports up to any desired amount. However, while a few specific examples of the differences between the patch panel device 204 and the switch devices 202a-202c (as well as conventional switch devices) have been described, one of skill in the art in possession of the present disclosure will appreciate that other differences exist between panel devices and switch devices as well.

In the illustrated embodiment, the networked system 200 also includes a plurality of powered devices 206a, 206b, and up to 206c. In an embodiment, the powered devices 206a-206c may be provided by the IHS 100 discussed above with reference to FIG. 1, and/or may include some or all of the components of the IHS 100, and in specific examples may include powered camera devices, powered badge/card readers, powered Voice over Internet Protocol (VoIP) phone devices, powered lighting devices, and/or other powered devices known in the art. However, while illustrated and discussed as being provided by particular powered devices, one of skill in the art in possession of the present disclosure will recognize that powered devices provided in the networked system 200 may include other powered devices that may be configured to operate similarly as the powered devices 206a-206b discussed below. The networked system 200 may also include a power source 208 that is coupled to the patch panel device 204, and that may be provided by Alternating Current (AC) power outlets, power storage systems (e.g., battery systems), power generating equipment, and/or any of a variety of power sources including any power source components/elements known in the art. However, while a specific networked system 200 has been illustrated and described, one of skill in the art in possession of the present disclosure will recognize that the powering patch panel system of the present disclosure may include a variety of components and component configurations while remaining within the scope of the present disclosure as well.

Figure 3:
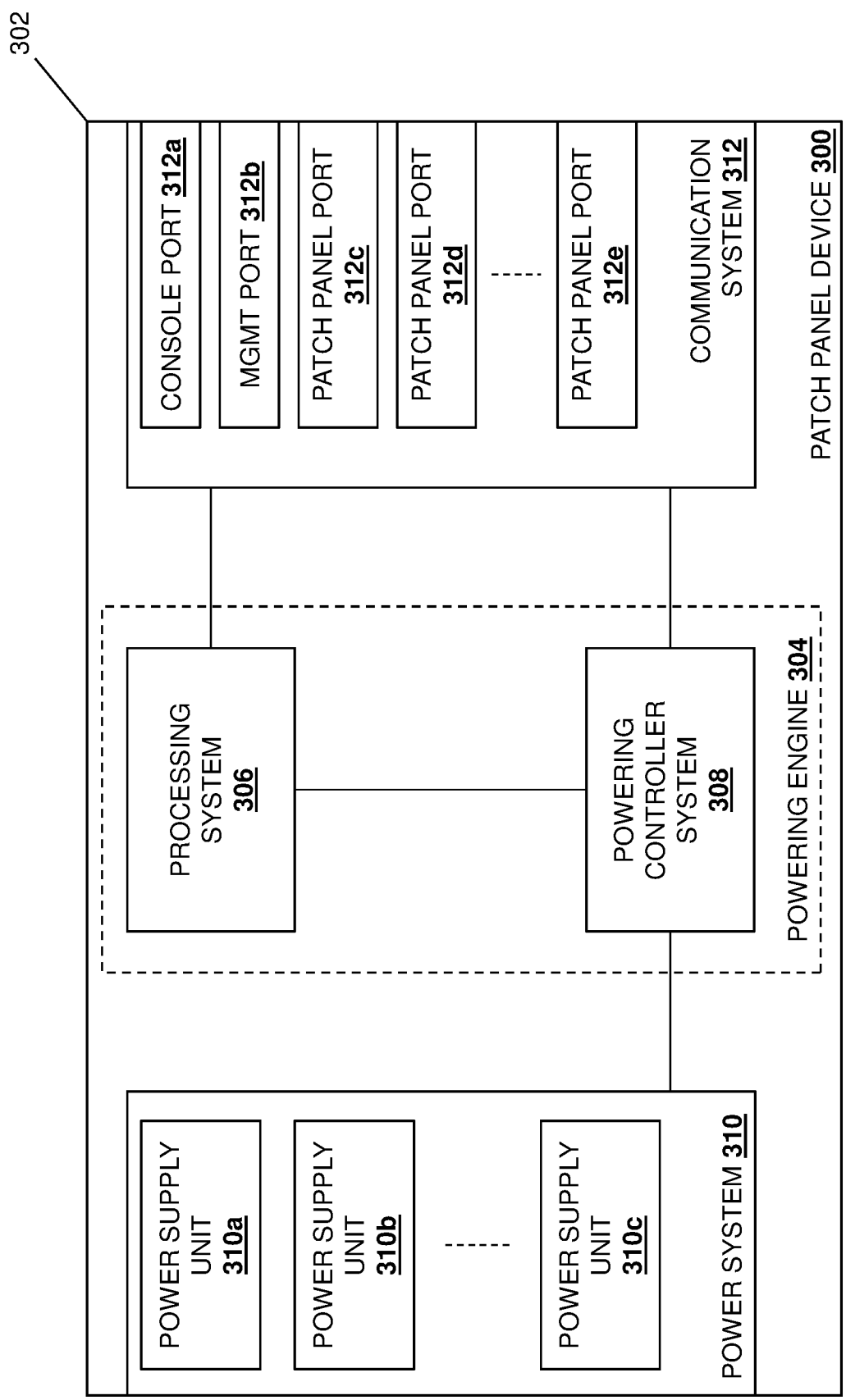
FIG. 3 is a schematic view illustrating an embodiment of a patch panel device that may be included in the networked system of FIG. 2.

Referring now to FIG. 3, an embodiment of a patch panel device 300 is illustrated that may provide the patch panel device 204 discussed above with reference to FIG. 2. As such, the patch panel device 300 may be provided by the IHS 100 discussed above with reference to FIG. 1 and/or may include some or all of the components of the IHS 100. In the illustrated embodiment, the patch panel device 300 includes a chassis 302 that houses the components of the patch panel device 300, only some of which are illustrated and discussed below. For example, the chassis 302 may house at least one processing device (not illustrated, but which may include the processor 102 discussed above with reference to FIG. 1) and at least one memory device (not illustrated, but which may include one or more of the memory 114 discussed above with reference to FIG. 1) that is coupled to the at least one processing device and that includes instructions that, when executed by the at least one processing device, cause the at least one processing device to provide a powering engine 304 that is configured to perform the functionality of the powering engines and/or patch panel devices discussed below.

In the embodiment illustrated in FIG. 3, the powering engine 304 includes a processing system 306 that may include one or more Network Processing Units (NPUs) (e.g., network processor device(s) that provide a subset of the processing device(s) in the powering engine 304) and corresponding NPU memory (e.g., network memory device(s) that provide a subset of the memory device(s) in the powering engine 304), and a power controller system 308 that may include one or more Power over Ethernet (PoE) controllers (e.g., PoE controller processor device(s) that provide a subset of the processing device(s) in the powering engine 304 and PoE controller memory device(s) that provide a subset of the memory device(s) in the powering engine 304). For example, any particular NPU/NPU memory combination may be capable of performing NPU operations for a subset of patch panel ports on the patch panel device 300, and any particular PoE controller may be capable of performing PoE operations for a subset of patch panel ports on the patch panel device 300, and thus the number of NPUs/NPU memory (or other processors/memory) and PoE controllers (or other powering controllers) included in the processing system 306 and powering controller system 308, respectively, may depend on the number of patch panel ports on the patch panel device 300.

In some examples, the processing system (e.g., NPUs and corresponding NPU memory) may include physical layer (PHY) devices (e.g., Ethernet chips) that are configured to perform the layer 1 (L1) negotiation operations discussed below, and in specific examples a respective PHY device may be included in or otherwise provided with each NPU (e.g., as part of each NPU Application Specific Integrated Circuit (ASIC)). Similarly, the powering controller system (e.g., PoE controllers) may include PHY devices (e.g., Ethernet chips) that are configured to perform the layer 1 (L1) negotiation operations discussed below, and in specific examples a respective PHY device may be included in or otherwise provided with each PoE controller. However, while particular configurations of processing system and powering controller system (e.g., including PHY devices) and functionality (e.g., L1 negotiation operations) are described above, one of skill in the art in possession of the present disclosure will appreciate how other configurations providing other functionality will fall within the scope of the present disclosure as well.

The chassis 302 may also house a power system 310 that is coupled to the powering controller system 308 in the powering engine 304 and that includes a plurality of power supply units 310a, 310b, and up to 310c, and while not illustrated, may include any of a variety of other power components that would be apparent to one of skill in the art in possession of the present disclosure. As discussed above and as will be appreciated by one of skill in the art in possession of the present disclosure, the chassis 302 of the patch panel device 204/300 is not constrained by form-factor limitations that are generally present for the switch devices 202a-202c discussed above with reference to FIG. 2 (e.g., 1 U and 2 U form-factor limitations for switch devices in a rack do not apply to patch panels that may include 4 U (or larger) form-factors), and thus the number of power supply units included in the power system 310 of the chassis 302 may selected based on the number of patch panel ports for which a maximum powering level will be provided. As such, the number of power supply units in the power system 310 will typically exceed the number of power supply units that are typically provided in conventional switch devices (e.g., a maximum of two power supply units for many conventional switch devices vs. eight or more power supply units for the patch panel device 300) and that typically limit the number of ports on conventional switch devices through which a maximum powering level may be provided.

The chassis 302 may also house a communication system 308 that is coupled to the processing system 306 and the powering controller system 308 in the powering engine 304 (e.g., via a coupling between the communication system 308 and the processor devices) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. In the illustrated example, the communication system 312 includes a console port 312a, a management ("MGMT") port 312b, and a plurality of patch panel ports 312c, 312d, and up to 312e. As discussed above, the powering patch panel system of the present disclosure allows the patch panel device 300 to include 128 patch panel ports, 256 patch panel ports, 512 patch panel ports, or more while providing maximum powering levels to each of those patch panel ports, as distinguished from conventional switch devices that can typically provide maximum powering levels to approximately 12 switch ports.

As discussed below, in some embodiments, a first subset of the patch panel ports 312c-312e may be optical-fiber-based ports (e.g., Multi-fiber Push-On (MPO) ports) connected via respective optical-fiber-based cables (e.g., MPO cables) to respective switch devices 202a-202c, and a second subset of the patch panel ports 312c-312e may be hybrid conductive-material/optical-fiber-based ports connected via respective hybrid conductive-material/optical-fiber-based cables to respective powered devices 206a-206c. For example, at least one of the inventors of the present disclosure has described the hybrid conductive-material/optical-fiber-based ports and/or hybrid conductive-material/optical-fiber-based cables referenced above at least in U.S. Pat. No. 11,012,156, issued on May 18, 2021; U.S. Pat. No. 11,011,288, issued on May 18, 2021; U.S. patent application Ser. No. 17/168,408, filed on Feb. 5, 2021; and U.S. patent application Ser. No. 17/203,930, filed on Mar. 17, 2021; the disclosures of which are incorporated herein by reference in their entirety.

As also discussed below, in some embodiments, a first subset of the patch panel ports 312c-312e may be optical-fiber-based ports (e.g., MPO ports) connected via respective optical-fiber-based cables (e.g., MPO cables) to respective switch devices 202a-202c, and a second subset of the patch panel ports 312c-312e may be conductive-material-based ports (e.g., Ethernet ports) connected via respective conductive-material-based cables (e.g., Ethernet cables) to respective powered devices 206a-206c. As also discussed below, in some embodiments, a first subset of the patch panel ports 312c-312e may be conductive-material-based ports (e.g., Ethernet ports) connected via respective conductive-material-based cables (e.g., Ethernet cables) to respective switch devices 202a-202c, and a second subset of the patch panel ports 312c-312e may be conductive-material-based ports (e.g., Ethernet ports) connected via respective conductive-material-based cables (e.g., Ethernet cables) to respective powered devices 206a-206c. However, while a specific patch panel device 300 has been illustrated and described, one of skill in the art in possession of the present disclosure will recognize that patch panel devices may include a variety of components and/or component configurations for providing conventional patch panel device functionality, as well as the functionality discussed below, while remaining within the scope of the present disclosure as well.

Figure 4:
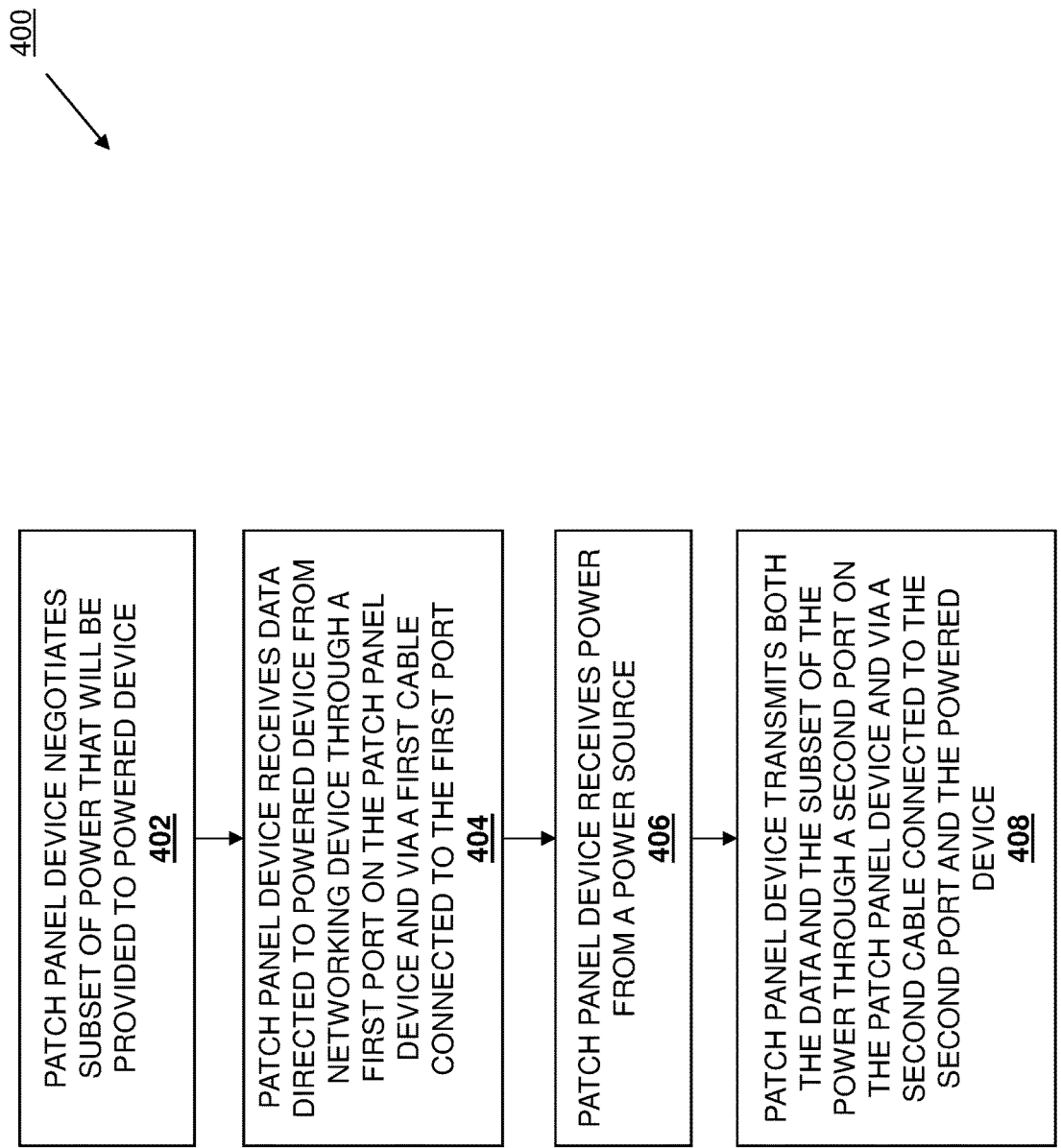
FIG. 4 is a flow chart illustrating an embodiment of a method for powering devices via a patch panel.

Referring now to FIG. 4, an embodiment of a method 400 of powering devices via a patch panel is illustrated. As discussed below, the systems and methods of the present disclosure provide a patch panel device configured to provide power along with data to powered devices via the power/data cabling connecting that patch panel device to each of those powered devices. For example, a powering patch panel system may include a patch panel device coupled to a power source, and including a first port that is coupled to a networking device via a first cable and a second port that is coupled to the powered device via a second cable. The patch panel device receives data that is directed to the powered device from the networking device through the first port and via the first cable, and receives power from the power source. The patch panel device then transmits both the data and a subset of the power through the second port and via the second cable to the powered device. As such, a conventional switch device may transmit data destined for a powered device to the patch panel device up to the limits of a data cable (e.g., approximately 300 meters for conventional Ethernet cables), and the patch panel device may transmit data along with power to that powered device up to the limits of a power/data cable (e.g., approximately 100 meters for conventional Ethernet cables), thus extending PoE distance limits of 100 meters to 400 meters. Furthermore, the patch panel device may have its power system configured to ensure that 128 ports, 256 ports, 512 ports, or more ports on the patch panel device are each capable of providing maximum powering levels to their respective connected powered devices, eliminating the need for additional switch devices in a datacenter due to switch device form-factor limitations that prevent their associated power systems from providing maximum powering levels to all of their switch ports.

Figure 5A:
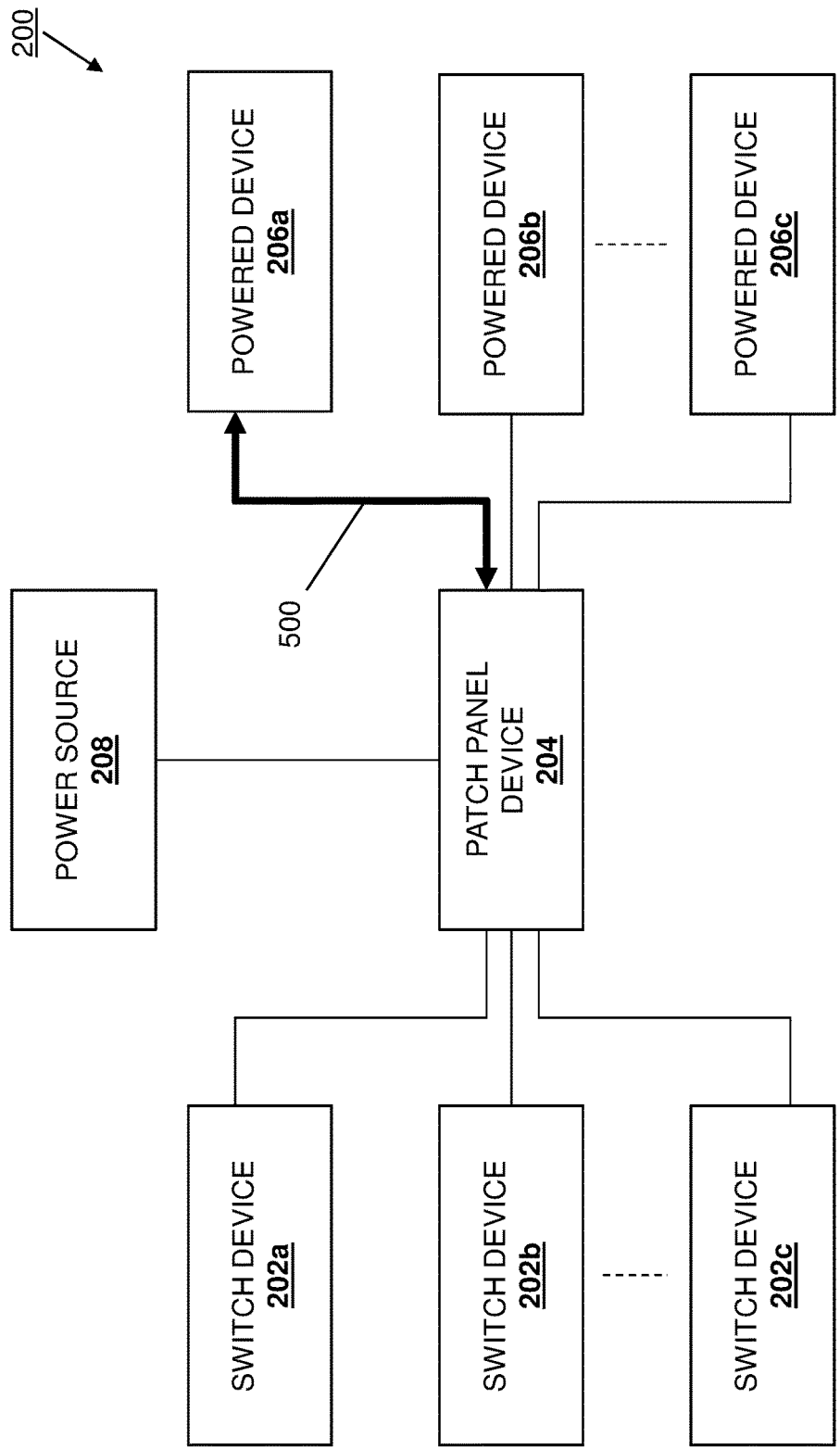
FIG. 5A is a schematic view illustrating an embodiment of the networked system of FIG. 2 operating during the method of FIG. 4.
Figure 5B:
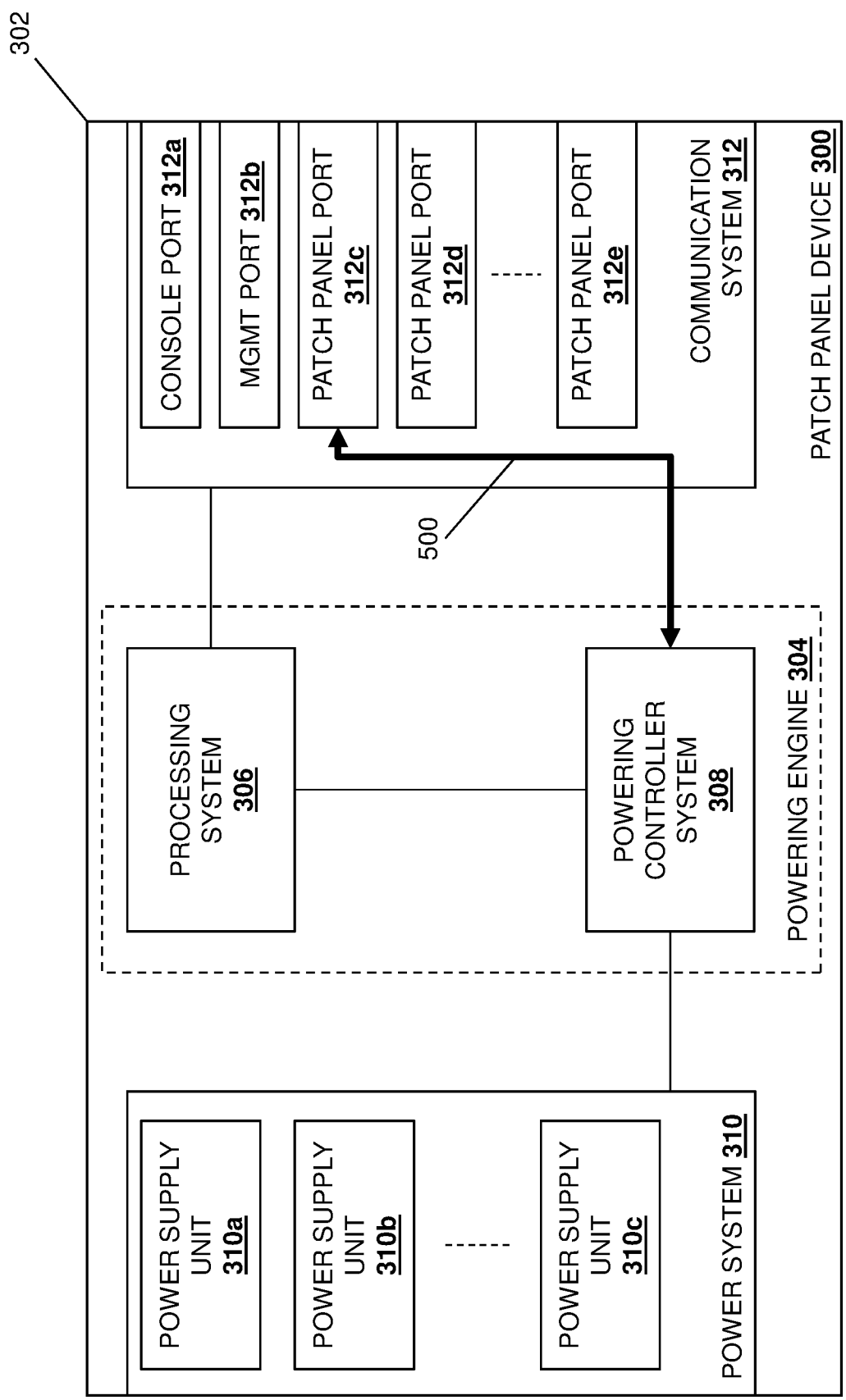
FIG. 5B is a schematic view illustrating an embodiment of the patch panel device of FIG. 3 operating during the method of FIG. 4.

The method 400 begins at block 402 where a patch panel device negotiates a subset of power that will be provided to a powered device. In an embodiment, at block 402, the powering controller system 308 may communicate via any of its patch panel ports 312c-312e that are connected to a powered device 206a-206c in order to perform powering negotiation operations with that powering device. For example, with reference to FIG. 5A ad 5B, the powering controller system 308 may perform powering negotiations operations 500 that include communicating via the patch panel port 312c that is connected to the powered device 206a in order to negotiate a subset of power that will be provided to the powered device 206a, and one of skill in the art in possession of the present disclosure will appreciate how similar negotiation operations may be performed with any of the other powered devices 206b-206c while remaining within the scope of the present disclosure as well. In some examples, powering negotiations operations may be enabled, at least in part, by configuring the patch panel ports 312c-312e that are connected to a powered device 206a-206c to perform conventional default PoE auto-negotiation operations, and then performing any of a variety of conventional default PoE auto-negotiation operations that one of skill in the art in possession of the present disclosure would recognize as defining a subset of power that will be provided by the patch panel device 204/300 to the powered device 206a via the patch panel port 312c.

Figure 5C:
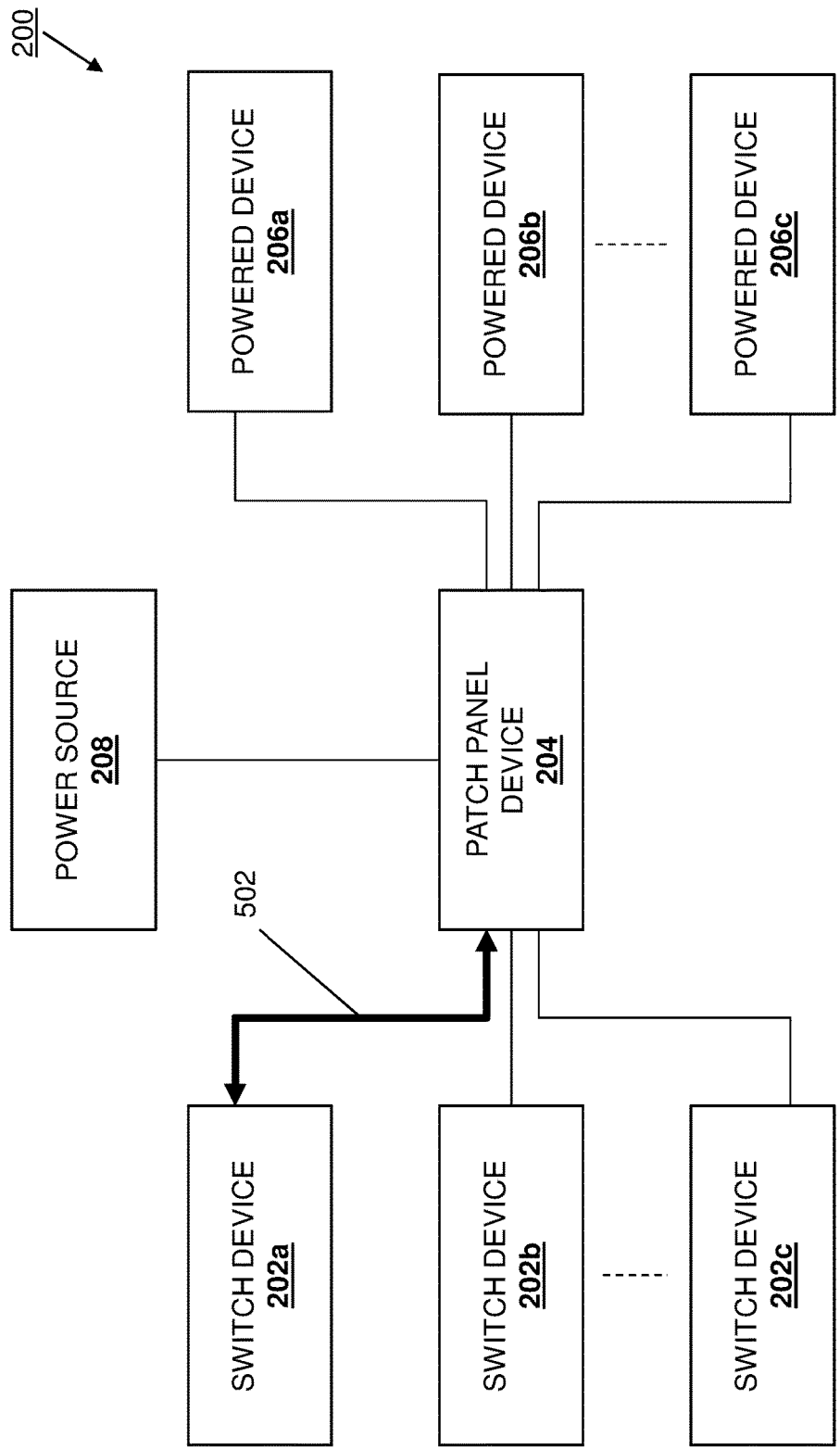
FIG. 5C is a schematic view illustrating an embodiment of the networked system of FIG. 2 operating during the method of FIG. 4.
Figure 5D:
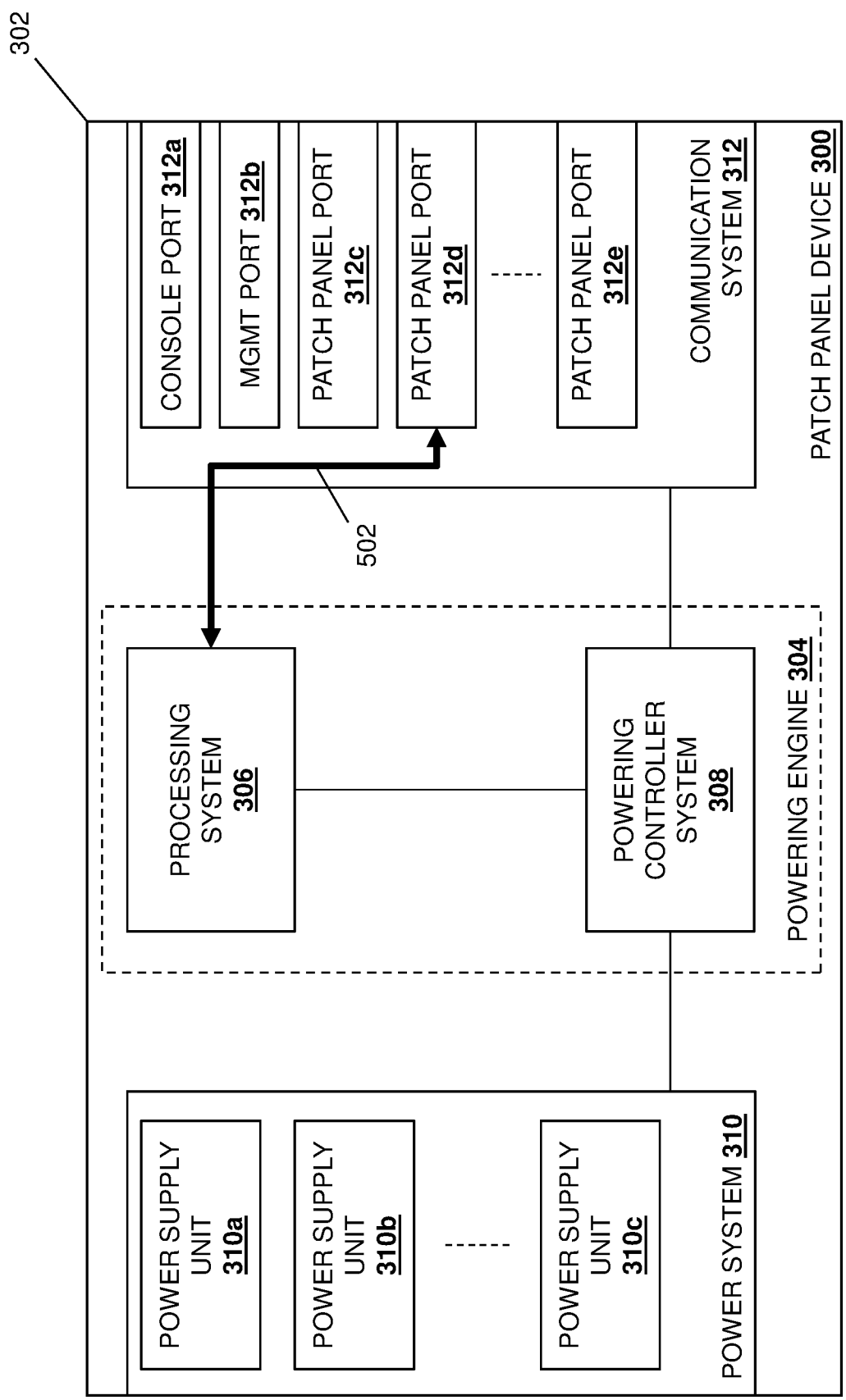
FIG. 5D is a schematic view illustrating an embodiment of the patch panel device of FIG. 3 operating during the method of FIG. 4.

In another embodiment, at block 402, the processing system 306 may communicate via any of its patch panel ports 312c-312e that are connected to a switch device 202a-202c in order to perform data communication negotiation operations (e.g., Ethernet negotiations) with that switch device. For example, with reference to FIGS. 5C and 5D, the processing system 306 may perform data communication negotiations operations 502 that include communicating via the patch panel port 312d that is connected to the switch device 202a in order to negotiate data communication parameters (e.g., Ethernet parameters) for data communications that will be exchanged with the switch device 202a, and one of skill in the art in possession of the present disclosure will appreciate how similar negotiation operations may be performed with any of the other switch devices 202b-202c while remaining within the scope of the present disclosure as well. In some examples, data communication negotiations operations may be enabled, at least in part, by configuring the patch panel ports 312c-312e that are connected to a powered device 206a-206c to perform conventional default Ethernet auto-negotiation operations, and then performing any of a variety of conventional default Ethernet auto-negotiation operations that one of skill in the art in possession of the present disclosure would recognize as defining the Ethernet parameters for data communications that will be provided by the patch panel device 204/300 to the switch device 202a via the patch panel port 312cd.

While PoE and Ethernet auto-negotiations are described above, in some embodiments, a network administrator or other user of the networked system may manually define data communications between the patch panel device 204/300 and any switch device 202a-202c, and/or manually define power/data communications between the patch panel device 204/300 and any powered device 206a-206c. As such, while the patch panel ports 312c-312e will typically function optimally in the default auto-negotiation modes (e.g., for Ethernet and PoE) discussed above, an administrator or other user may connect to the console port 312a or the management port 312b of the patch panel device 204/300 in order to set data communication parameters (e.g., Ethernet parameters) for data communications with any of the switch devices 202a/202c, or define a subset of power that may be provided to any of the powered devices 206a-206c. For example, the patch panel device 300 may run a Linux kernel (e.g., a Suse Linux kernel, a Debian Linux kernel, an Ubuntu Linux kernel, or other Linus Enterprise Server variants known in the art) that allows the processing system 306 (e.g., an Ethernet ASIC/NPU device), the powering controller system 308 (e.g., a PoE controller), and/or one or more default settings to be configured. One of skill in the art in possession of the present disclosure will appreciate how streamlined kernels may allow "plug-and-play" connectivity with the patch panel device 204/300 with minimal management requirements, and may be accessed via serial control ports (e.g., the console port 312a) or out-of-band management ports (e.g., the management port 312b) via standard accessibility interfaces and via industry standards.

Figure 5E:
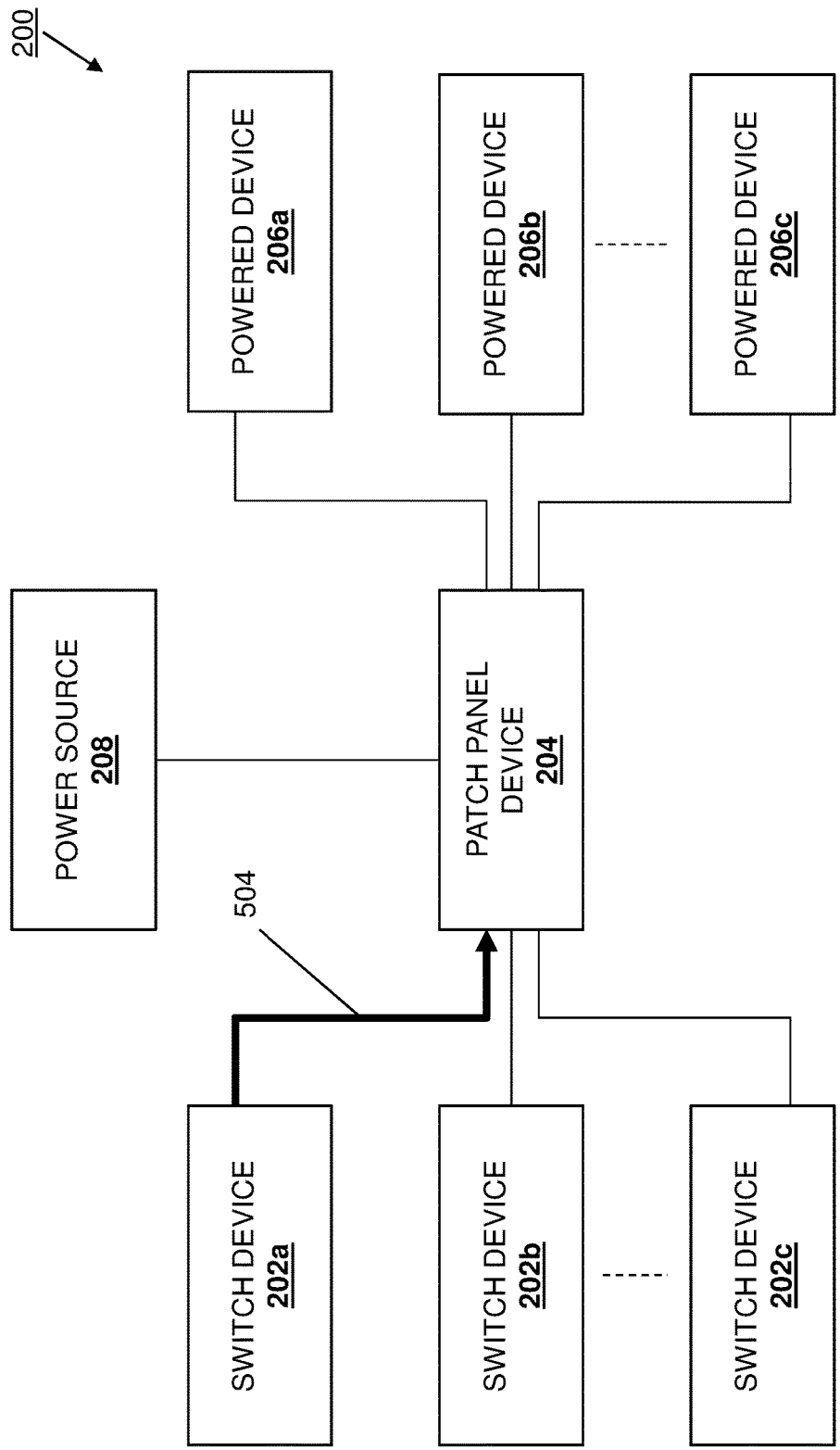
FIG. 5E is a schematic view illustrating an embodiment of the networked system of FIG. 2 operating during the method of FIG. 4.
Figure 5F:
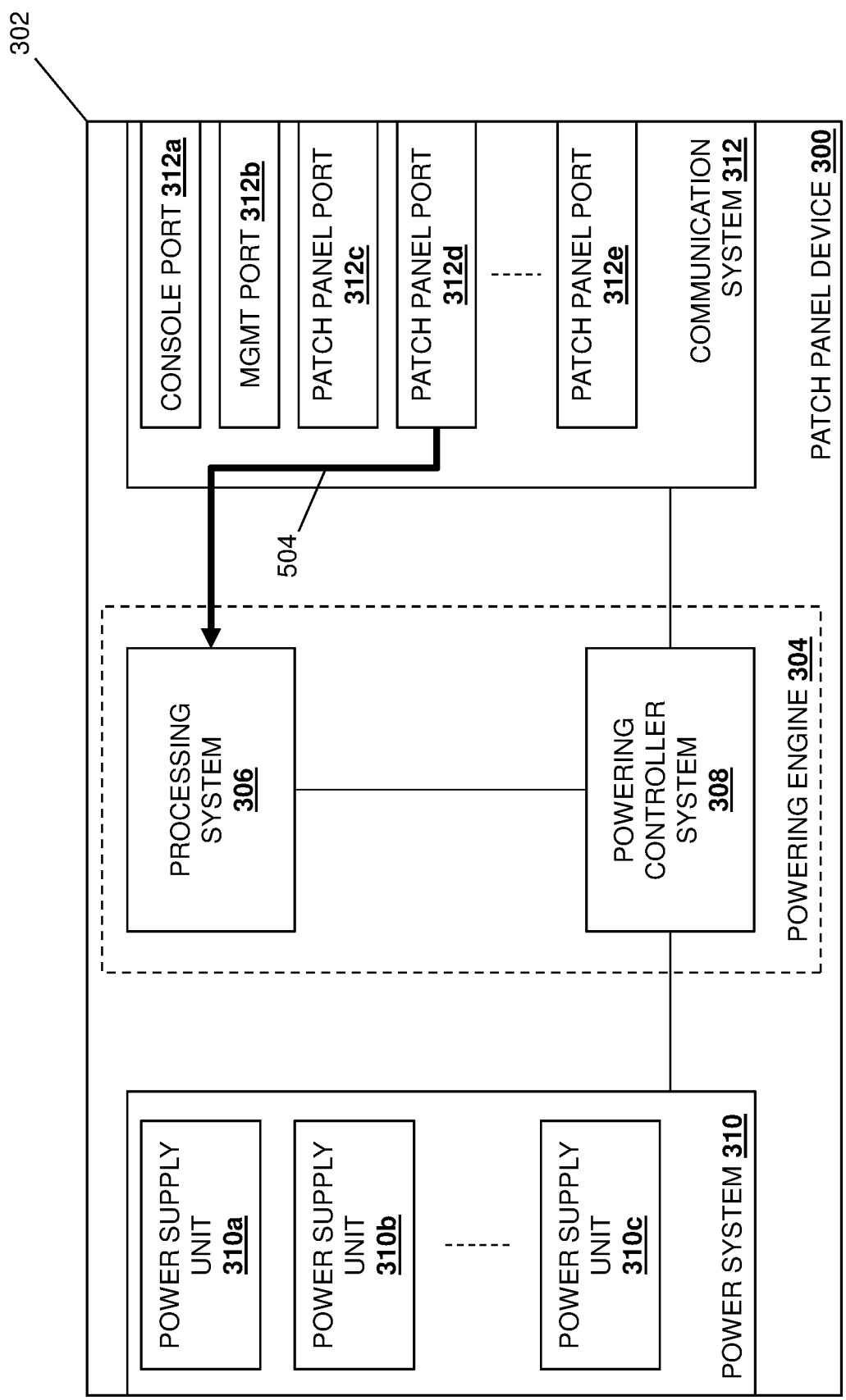
FIG. 5F is a schematic view illustrating an embodiment of the patch panel device of FIG. 3 operating during the method of FIG. 4.

The method 400 then proceeds to block 404 where the patch panel device receives data directed to the powered device from a networking device through a first port on the patch panel device and via a first cable connected to the first port. In an embodiment, at block 404, the patch panel device 204 may receive data from any of the switch devices 202a-202c that is directed to any of the powered devices 206a-206c. For example, with reference to FIGS. 5E and 5F and in an embodiment of block 404, the processing system 206 in the patch panel device 204 may perform data receiving operations 504 that include receiving data from the switch device 202a via the patch panel port 312d that is connected to the switch device 202a and, as discussed in further detail below, that data may be directed to the powered device 206a.

As discussed above, in specific examples, the data received from the switch device 202a at block 404 may be transmitted via a conventional Ethernet cable that is up to 300 meters long (e.g., up to the limits of that data transmission capabilities of conventional Ethernet cables) and that is connected to both the switch device 202a and the patch panel ports 312d. However, as discussed above, in other embodiments, data may be received from any switch device 202a-202c via an optical-fiber-based cable, thus increasing the distance which that data may be transmitted to over 300 meters. Furthermore, while a specific example of receiving data from the switch device 202a is described, one of skill in the art in possession of the present disclosure will appreciate how data may be received from the other switch devices 202b-202c in a similar manner while remaining within the scope of the present disclosure as well.

Figure 5G:
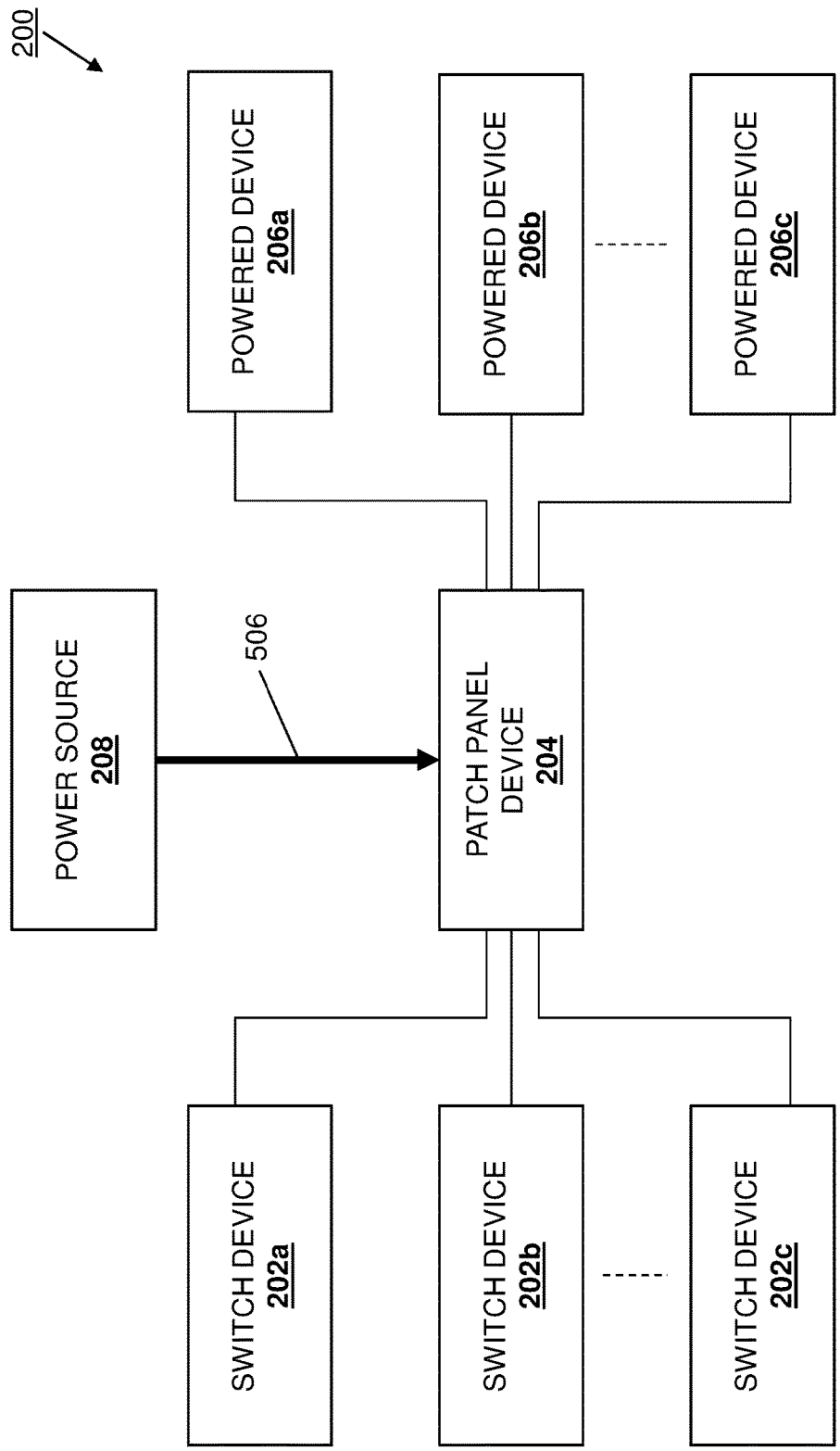
FIG. 5G is a schematic view illustrating an embodiment of the networked system of FIG. 2 operating during the method of FIG. 4.
Figure 5H:
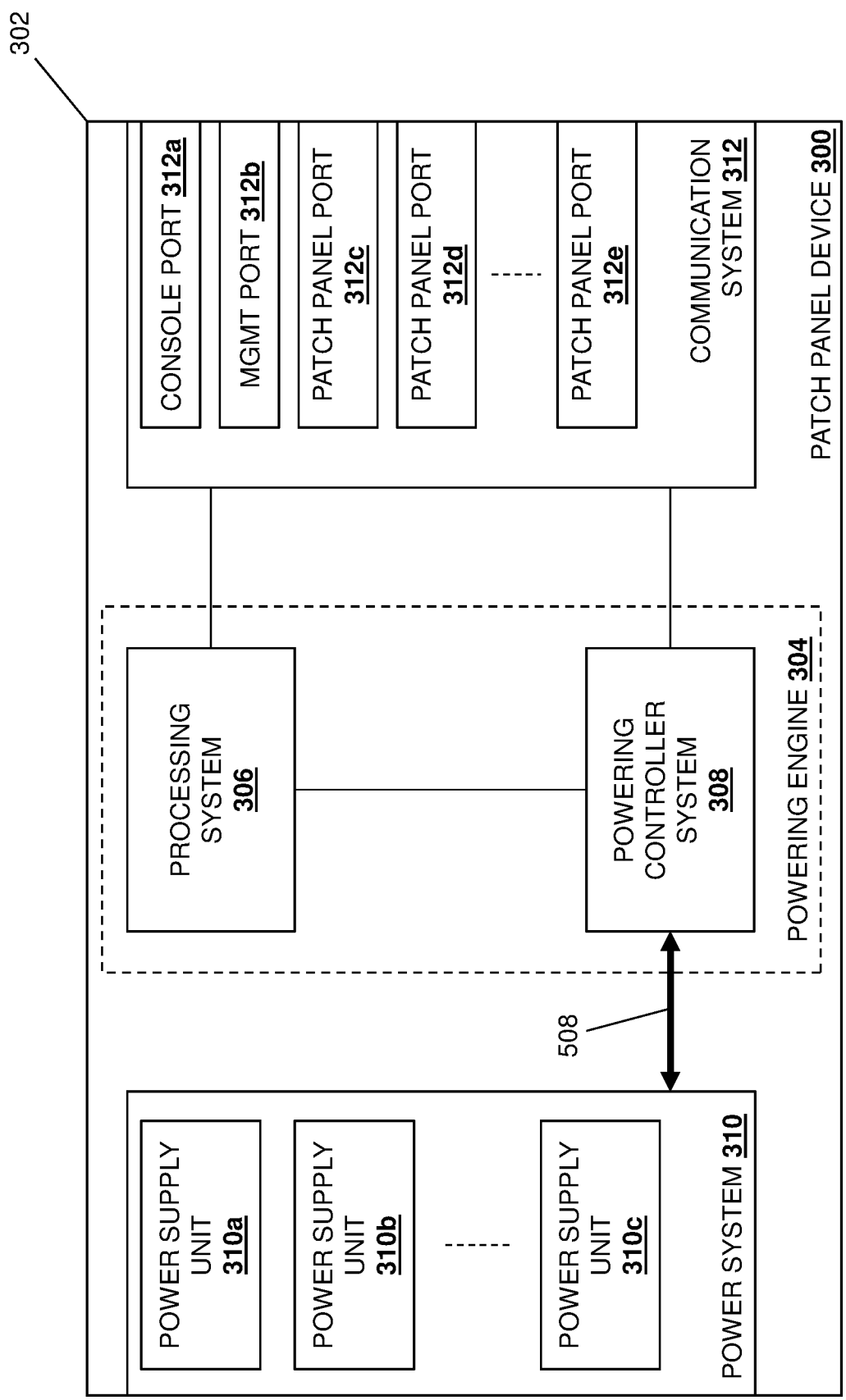
FIG. 5H is a schematic view illustrating an embodiment of the patch panel device of FIG. 3 operating during the method of FIG. 4.

The method 400 then proceeds to block 406 where the patch panel device receives power from a power source. With reference to FIG. 5G, in an embodiment of block 406, the patch panel device 204/300 may perform power receiving operations 506 that include receiving power from the power source 208 and, as illustrated in FIG. 5H, the powering controller system 308 may then perform power accessing operations 508 that include accessing the power received by the power system 310 in the patch panel device 204/300 as part of the powering receiving operations 506 (as well as the power provisioning operations described below). As discussed above, the power received as part of the power receiving operations 506 may translate into a relatively large power provisioning capacity in the patch panel device 204/300 due to the relatively large number of power supply units 310a-310c that the chassis 302 is capable of housing, which may be configured to allow the powering controller system 308 to power each of the patch panel ports 312c-312e up to a maximum powering level (e.g., a class 4 universal PoE (uPoE) powering level) even when the patch panel device 204/300 includes 128 patch panel ports, 256 patch panel ports, 512 patch panel ports, or more.

Figure 5I:
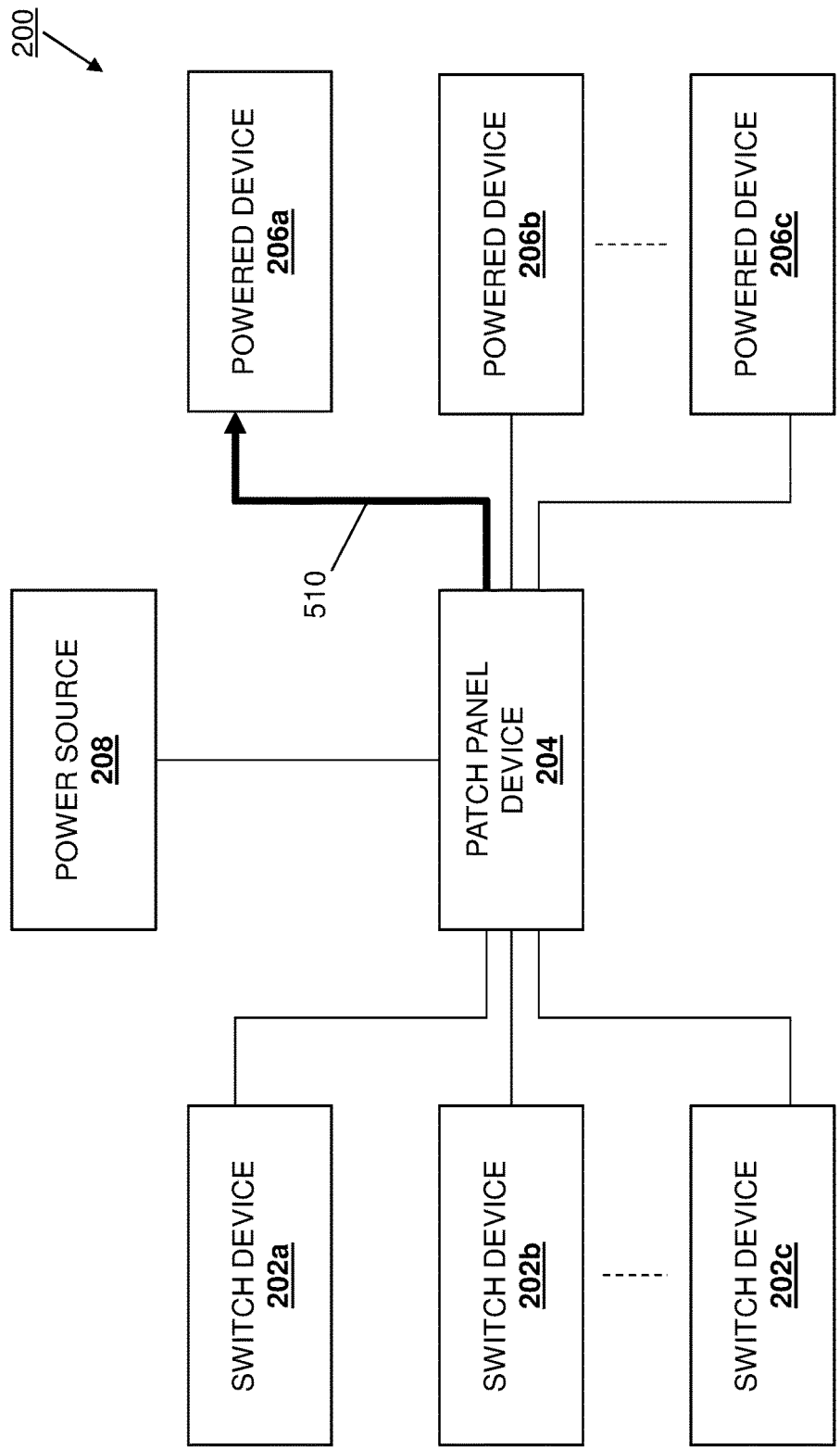
FIG. 5I is a schematic view illustrating an embodiment of the networked system of FIG. 2 operating during the method of FIG. 4.
Figure 5J:
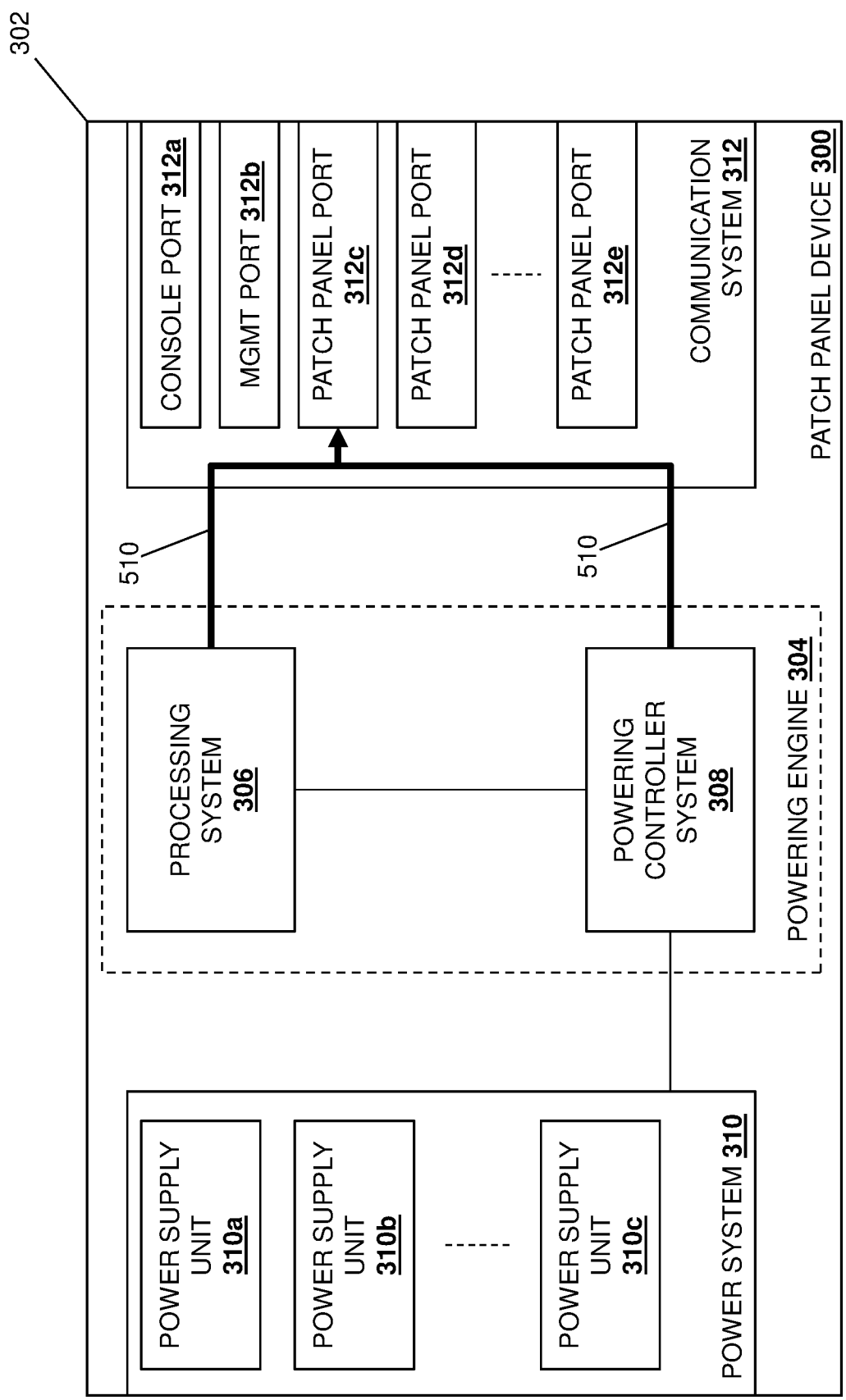
FIG. 5J is a schematic view illustrating an embodiment of the patch panel device of FIG. 3 operating during the method of FIG. 4.

The method 400 then proceeds to block 408 where the patch panel device transmits both the data and the subset of the power through a second port on the patch panel device and via a second cable connected to the second port and the powered device. In an embodiment, at block 408, the patch panel device 204 may transmit any data received at block 404 along with a subset of the power received at block 406 to any of the powered devices 206a-206c. For example, with reference to FIGS. 5I and 5J and in an embodiment of block 408, the processing system 306 and the powering controller system 308 in the patch panel device 204/300 may perform power/data transmission operations 510 in order to transmit the data received from the switch device 202a along with a subset of the power received from the power source 208 that is based on the negotiations performed at block 402 to the powered device 206a.

As discussed above, in specific examples, the data and the subset of the power may be transmitted to the powered device 206a via an Ethernet cable (or other conductive-material-based cable) that is up to 100 meters long (e.g., up to the limits of the power transmission capabilities of conventional Ethernet cables) and that is connected to both the powered device 206a and the patch panel port 312c. As such, the patch panel device 204/300 may transmit data and a subset of the power received from the power source 208 to each of the powered devices 206a-206c, with the distance between any of the switch devices 202a-202b and any of the powered devices 206a-206b extended to up to 400 meters when powering a powered device using conventional Ethernet cabling (i.e., as compared to 100 meters when a conventional PoE switch device is connected to a powered device via conventional Ethernet cabling). However, as discussed above, in other embodiments, data may be transmitted to any powering device 206a-206c via an optical-fiber-based cable or an optical-fiber-based portion of a hybrid conductive-material-based/optical fiber-based cable while remaining within the scope of the present disclosure as well.

As discussed above, in some embodiments one or more of the switch devices 202a-202c may be configured to power powered devices (e.g., those switch devices may be PoE capable). In such embodiments, the ports on that switch device that are connected to the patch panel ports 312c-312e on the patch panel device 204 may have their powering capabilities (e.g., PoE functionality) disabled.

Thus, systems and methods have been described that provide a patch panel device configured to provide power along with data to powered devices via the power/data cabling connecting that patch panel device to each of those powered devices. For example, a powering patch panel system may include a patch panel device coupled to a power source, and including a first port that is coupled to a networking device via a first cable and a second port that is coupled to the powered device via a second cable. The patch panel device receives data that is directed to the powered device from the networking device through the first port and via the first cable, and receives power from the power source. The patch panel device then transmits both the data and a subset of the power through the second port and via the second cable to the powered device. As such, a conventional switch device may transmit data destined for a powered device to the patch panel device up to the limits of a data cable (e.g., approximately 300 meters for conventional Ethernet cables), and the patch panel device may transmit data along with power to that powered device up to the limits of a power/data cable (e.g., approximately 100 meters for conventional Ethernet cables), thus extending PoE distance limits of 100 meters to 400 meters. Furthermore, the patch panel device may have its power system configured to ensure that 128 ports, 256 ports, 512 ports, or more, are capable of providing maximum powering levels to their respective connected powered devices, eliminating the need for additional switch devices in a datacenter due to switch device form-factor limitations that prevent their associated power systems from providing maximum powering levels to all of their switch ports Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A powering patch panel system, comprising:
   a plurality of networking devices;
   a plurality of powered devices;
   a power source; and
   a patch panel device that includes:
      a chassis;
      a plurality of patch panel ports that are provided on the chassis and that are each connected directly to one of the plurality of networking devices or one of the plurality of powered devices by a respective cable;
      a plurality of Network Processing Units (NPUs) that are housed in the chassis, wherein each of the plurality of NPUs is coupled to a respective subset of the plurality of patch panel ports and is configured to perform NPU operations for that respective subset of the plurality of patch panel ports; and
      a plurality of Power over Ethernet (PoE) controllers that are housed in the chassis, wherein each of the plurality of PoE controllers is coupled to a respective subset of the plurality of patch panel ports and is configured to perform PoE operations for that respective subset of the plurality of patch panel ports, wherein the patch panel device is configured to:
         perform, with each of the plurality of powered devices using the PoE controller coupled to that powered device by one of the plurality of patch panel ports the PoE operations to negotiate a power amount that will be provided to each of the plurality of powered devices;
         receive, from each of the plurality of networking devices via the NPU operations performed by the NPU coupled to that networking device by one of the plurality of patch panel ports, data that is directed to the plurality of powered devices;
         receive, from the power source using each of the plurality of PoE controllers, power; and
         transmit, to each of the plurality of powered devices via the NPU operations performed by the NPU and the PoE operations performed by PoE controller coupled to that powered device by one of the plurality of patch panel ports, both the data and a subset of the power that provides the power amount that was negotiated for each of those powered devices.

2. The system of claim 1, wherein at least one of the plurality of patch panel ports is an optical-fiber-based port coupled to a respective optical-fiber-based cable, and wherein at least one of the plurality of patch panel ports is a hybrid conductive-material/optical-fiber-based port and coupled to a hybrid conductive-material/optical-fiber-based cable.

3. The system of claim 1, wherein at least one of the plurality of patch panel ports is an optical-fiber-based port coupled to a respective optical-fiber-based cable, and wherein at least one of the plurality of patch panel ports is a conductive-material-based port coupled to a respective conductive-material-based cable.

4. The system of claim 1, wherein at least one of the plurality of patch panel ports is a conductive-material-based port coupled to a respective conductive-material-based cable, and wherein at least one of the plurality of patch panel ports is a conductive-material-based port coupled to a respective conductive-material-based cable.

5. The system of claim 1, wherein the respective cable coupling at least one of the plurality of patch panel ports to one of the plurality of networking devices and the respective cable coupling at least one of the plurality of patch panel ports to one of the plurality of powered devices have a combined length that is greater than 100 meters.

6. The system of claim 1, wherein the patch panel device is configured to:
perform, with each of the plurality of networking devices via the NPU operations performed by the NPU coupled to that networking device by one of the plurality of patch panel ports and prior to receiving the data from each of the plurality of networking devices, data communication negotiating operations to negotiate data communication parameters for data communications that are transmitted to each of the plurality of powered devices.

7. A patch panel Information Handling System (IHS), comprising:
a chassis;
a plurality of patch panel ports that are provided on the chassis and that are each connected directly to one of a plurality of networking devices or one of a plurality of powered devices via a respective cable;
a plurality of networking processors that are housed in the chassis, wherein each of the plurality of networking processors is coupled to a respective subset of the plurality of patch panel ports;
a plurality of Power over Ethernet (PoE) processors that are housed in the chassis, wherein each of the plurality of PoE processors is coupled to a respective subset of the plurality of patch panel ports;
a respective networking memory device housed in the chassis, coupled to each of the plurality of networking processors, and including instructions that, when executed by each of the plurality of networking processors, cause each of the plurality of networking processors to provide a networking engine; and
a respective PoE memory device housed in the chassis, coupled to each of the plurality of PoE processors, and including instructions that, when executed by the plurality of PoE processors, cause each of the PoE processors to provide a PoE engine,
wherein each of the PoE engines is configured to:
perform, with each of the plurality of powered devices coupled to that PoE engine via one of the plurality of patch panel ports PoE operations to negotiate a power amount that will be provided to each of the plurality of powered devices;
wherein each of the networking engines is configured to:
receive, from each of the plurality of networking devices coupled to that networking engine by one of the plurality of patch panel ports and via networking operations performed by that networking engine, data that is directed to the plurality of powered devices;
wherein each of the PoE engines is configured to:
receive, from a power source, power; and
wherein each of a plurality of networking engine/POE engine combinations is configured to:
transmit, to each of the plurality of powered devices coupled to that networking engine/PoE engine combination by one of the plurality of patch panel ports and via the networking operations performed by the networking engine in that networking engine/PoE engine combination and the PoE operations performed by the PoE engine in that networking engine/PoE combination, both the data and a subset of the power that provides the power amount that was negotiated for each of those powered devices.

8. The IHS of claim 7, wherein at least one of the plurality of patch panel ports is an optical-fiber-based port coupled to a respective optical-fiber-based cable, and wherein at least one of the plurality of patch panel ports is a hybrid conductive-material/optical-fiber-based port coupled to a respective hybrid conductive-material/optical-fiber-based cable.

9. The IHS of claim 7, wherein at least one of the plurality of patch panel ports is an optical-fiber-based port coupled to a respective optical-fiber-based cable, and wherein at least one of the plurality of patch panel ports is a conductive-material-based port coupled to a respective conductive-material-based cable.

10. The IHS of claim 7, wherein at least one of the plurality of patch panel ports is a conductive-material-based port coupled to a respective conductive-material-based cable, and wherein at least one of the plurality of patch panel ports is a conductive-material-based port coupled to a respective conductive-material-based cable.

11. The IHS of claim 7, wherein the respective cable coupling at least one of the plurality of patch panel ports to one of the plurality of networking devices and the respective cable coupling at least one of the plurality of patch panel ports to one of the plurality of powered devices have a combined length that is greater than 100 meters.

12. The IHS of claim 7, wherein the patch panel powering engine that is configured to:
perform, with each of the plurality of networking devices via the networking operations performed by the networking engine coupled to that networking device by one of the plurality of patch panel ports and prior to receiving the data from each of the plurality of networking devices, data communication negotiating operations to negotiate data communication parameters for data communications that are transmitted to each of the plurality of powered devices.

13. The IHS of claim 7, wherein the each networking processor includes a Network Processing Unit (NPU) and each PoE processor includes a Power over Ethernet (PoE) controller.

14. A method for powering devices via a patch panel, comprising:
performing, by a plurality of PoE controllers that are each housed in a chassis and coupled to a respective subset of a plurality of patch panel ports that are each provided on the chassis and that are each connected directly to a respective one of a plurality of networking devices or a plurality of powered devices by a respective cable, PoE operations to negotiate a power amount that will be provided to each of the plurality of powered devices;
receiving, from each of the plurality of networking devices via Network Processing Units (NPU) operations performed by a respective NPU that is housed in the chassis and coupled to that networking device by a respective one of the plurality of patch panel ports, data that is directed to the plurality of powered devices;
receiving, by each of the plurality of PoE controllers from a power source, power; and
transmitting, to each of the plurality of powered devices via the NPU operations performed by the NPU and the PoE operations performed by PoE controller coupled to that powered device by one of the plurality of patch panel ports, both the data and a subset of the power that provides the power amount that was negotiated for each of those powered devices.

15. The method of claim 14, wherein at least one of the plurality of patch panel ports is an optical-fiber-based port coupled to a respective optical-fiber-based cable, and wherein at least one of the plurality of patch panel ports is a hybrid conductive-material/optical-fiber-based port coupled to a respective hybrid conductive-material/optical-fiber-based cable.

16. The method of claim 14, wherein at least one of the plurality of patch panel ports is an optical-fiber-based port coupled to a respective optical-fiber-based cable, and wherein at least one of the plurality of patch panel ports is a conductive-material-based port coupled to a respective conductive-material-based cable.

17. The method of claim 14, wherein at least one of the plurality of patch panel ports is a conductive-material-based port coupled to a respective conductive-material-based cable, and wherein at least one of the plurality of patch panel ports is a conductive-material-based port coupled to a respective conductive-material-based cable.

18. The method of claim 14, wherein the respective cable coupling the at least one of the plurality of patch panel ports to the one of the plurality of networking devices and the respective cable coupling the at least one of the plurality of patch panel ports to the one of the plurality of powered devices have a combined length that is greater than 100 meters.

19. The method of claim 14, further comprising:
performing, with each of the plurality of networking devices via the NPU operations performed by the NPU coupled to that networking device by one of the plurality of patch panel ports and prior to receiving the data from each of the plurality of networking devices, data communication negotiating operations to negotiate data communication parameters for data communications that are transmitted to each of the plurality of powered devices.

20. The method of claim 14, wherein at least 256 patch panel ports are included on the chassis.

* * * * *